US010815148B2

(12) United States Patent
Lorenzzi et al.

(10) Patent No.: US 10,815,148 B2
(45) Date of Patent: Oct. 27, 2020

(54) GLAZING COMPRISING A PROTECTIVE COATING

(71) Applicant: SAINT-GOBAIN GLASS FRANCE, Courbevoie (FR)

(72) Inventors: Jean-Carlos Lorenzzi, Paris (FR); Benoît Georges, Abu Dhabi (AE); Stéphane Laurent, Orleans (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 201 days.

(21) Appl. No.: 15/552,956

(22) PCT Filed: Feb. 23, 2016

(86) PCT No.: PCT/FR2016/050419
§ 371 (c)(1),
(2) Date: Aug. 23, 2017

(87) PCT Pub. No.: WO2016/135417
PCT Pub. Date: Sep. 1, 2016

(65) Prior Publication Data
US 2018/0029930 A1 Feb. 1, 2018

(30) Foreign Application Priority Data

Feb. 24, 2015 (FR) ...................... 15 51552

(51) Int. Cl.
*C03C 17/36* (2006.01)

(52) U.S. Cl.
CPC ............ *C03C 17/366* (2013.01); *C03C 17/36* (2013.01); *C03C 17/3626* (2013.01); *C03C 17/3634* (2013.01); *C03C 17/3639* (2013.01); *C03C 17/3644* (2013.01); *C03C 17/3652* (2013.01); *C03C 2217/212* (2013.01); *C03C 2217/256* (2013.01); *C03C 2217/258* (2013.01); *C03C 2217/261* (2013.01); *C03C 2217/281* (2013.01); *C03C 2217/78* (2013.01); *C03C 2218/156* (2013.01); *C03C 2218/328* (2013.01); *C03C 2218/355* (2013.01)

(58) Field of Classification Search
CPC .... C09D 5/008; C03C 17/366; C03C 17/3652
See application file for complete search history.

(56) References Cited

U.S. PATENT DOCUMENTS

| 4,786,563 | A | * | 11/1988 | Gillery | .................... | C03C 17/36 428/432 |
| 5,948,538 | A | * | 9/1999 | Brochot | ................... | C03C 17/36 359/359 |
| 6,045,896 | A | * | 4/2000 | Boire | ....................... | C03C 17/36 204/192.23 |
| 6,060,178 | A | * | 5/2000 | Krisko | .................... | C03C 17/36 359/359 |
| 6,287,675 | B1 | * | 9/2001 | Guiselin | ........... | B32B 17/10174 428/213 |
| 6,413,643 | B1 | * | 7/2002 | Kunisada | ................. | C03C 17/36 359/360 |
| 6,416,872 | B1 | * | 7/2002 | Maschwitz | ....... | B32B 17/10174 428/469 |
| 7,659,002 | B2 | * | 2/2010 | Coster | ............... | B32B 17/10036 428/432 |
| 8,105,695 | B2 | * | 1/2012 | Depauw | .................. | C03C 17/36 428/432 |
| 2003/0143401 | A1 | * | 7/2003 | Hukari | ................ | C03C 17/3435 428/408 |
| 2003/0228471 | A1 | * | 12/2003 | Hayakawa | .............. | C03C 3/066 428/426 |
| 2005/0048284 | A1 | * | 3/2005 | Veerasamy | ......... | B32B 17/1033 428/408 |
| 2005/0106397 | A1 | * | 5/2005 | Krisko | .............. | B32B 17/10036 428/432 |
| 2005/0153126 | A1 | * | 7/2005 | Finley | .................. | B65G 49/069 428/336 |
| 2006/0246300 | A1 | * | 11/2006 | Hevesi | .................... | C03C 17/36 428/432 |
| 2011/0020638 | A1 | * | 1/2011 | Di Stefano | ............. | C03C 17/36 428/336 |
| 2013/0115468 | A1 | * | 5/2013 | Kharchenko | ............ | B05D 5/12 428/426 |

FOREIGN PATENT DOCUMENTS

| EP | 1 338 576 A1 | 8/2003 |
| EP | 1 451 118 B1 | 7/2009 |
| EP | 2 289 856 A2 | 3/2011 |
| EP | 2 598 454 B1 | 9/2014 |
| WO | WO 2006/069068 A2 | 6/2006 |
| WO | WO 2008/096089 A2 | 8/2008 |
| WO | WO 2012/022874 A1 | 2/2012 |

\* cited by examiner

OTHER PUBLICATIONS

International Search Report as issued in International Patent Application No. PCT/FR2016/050419, dated May 13, 2016.

*Primary Examiner* — Callie E Shosho
*Assistant Examiner* — John Vincent Lawler
(74) *Attorney, Agent, or Firm* — Pillsbury Winthrop Shaw Pittman LLP

(57) ABSTRACT

A material includes a transparent substrate coated with a stack of thin layers including at least one silver-based functional layer, wherein the stack includes a protective coating deposited on top of at least one portion of the functional layer, the protective coating including: a lower protective layer having a thickness of between 1 and 10 nm, a central protective layer based on carbon graphite located on top of the lower protective layer, and an upper protective layer having a thickness of between 1 and 10 nm located on top of the central protective layer.

18 Claims, No Drawings

GLAZING COMPRISING A PROTECTIVE COATING

CROSS-REFERENCE TO RELATED APPLICATIONS

This application is the U.S. National Stage of PCT/FR2016/050419, filed Feb. 23, 2016, which in turn claims priority to French patent application number 1551552 filed Feb. 24, 2015, The content of these applications are incorporated herein by reference in their entireties.

The invention relates to a material and a process for preparing a material, such as glazing, comprising a transparent substrate coated with a stack of thin layers acting on infrared radiation, comprising at least one silver-based functional layer.

Silver-based functional layers (or silver layers) are useful in several respects: by reflecting infrared, thermal or solar radiation, they impart on the material low-emissivity or solar-controlled functions. Since they are electrically conductive, they also make it possible to obtain conductive materials, for example heating glazings or electrodes.

Silver-based functional layers are deposited between coatings based on dielectric materials which generally comprise several dielectric layers making it possible to adjust the optical properties of the stack.

Frequently, such materials must undergo heat treatments, intended to improve the properties of the substrate and/or of the stack of thin layers. In the case of glass substrates, these may for example be thermal tempering treatments intended to mechanically strengthen the substrate by creating strong compressive stresses at its surface. Such treatments can also improve certain properties of the stack, in particular by improving the thin-layer crystallization characteristics. For example, a stack comprising a silver layer, which has low emissivity and electrical conduction properties, experiences an improvement in these properties when its crystalline structure is of better quality: larger grains, decrease in grain boundaries, etc.

It is known practice to subject substrates which have such stacks to thermal tempering or annealing treatments, in tempering or annealing furnaces, or else to rapid annealing treatments, for example using a flame, a plasma torch or laser radiation, as described in application WO 2008/096089.

The mechanical strength and chemical resistance of these materials comprising complex stacks subjected to high-temperature heat treatments is often insufficient, this being the case, a fortiori, when the functional layers are of silver-based metal layers. This low strength and low resistance is reflected by the appearance in the short term of defects, such as corrosion points, scratches, or even the complete or partial tearing of the stack when it is used under standard conditions. All defects or scratches, whether they are due to corrosion, to mechanical stresses or to weak adhesion between adjacent layers, are liable to detrimentally affect not only the attractiveness of the coated substrate but also its optical and energy performance levels.

Upper protective layers are conventionally used for various purposes, in particular for improving scratch resistance, corrosion resistance and/or resistance to high-temperature heat treatments.

For example, upper protective layers based on titanium oxide and on mixed zinc tin oxide are known.

It is also known practice to use layers of carbon in the graphite or amorphous form for improving scratch resistance.

"DLC" ("Diamond-Like-Carbon") amorphous carbon layers comprise carbon atoms in a mixture of $sp^2$ and $sp^3$ hybridization states. Such layers cannot be deposited by a conventional magnetron process. They are generally obtained by plasma-enhanced chemical vapor deposition (PECVD), by laser ablation, by arc sputtering or by ion beam deposition.

Carbon "graphite" layers comprise carbon atoms essentially in an $sp^2$ hybridization state. Such layers are sometimes used as a temporary protective layer. They can then be removed during a heat treatment, by oxidation to carbon dioxide.

However, the substrates coated with such layers do not have sufficient scratch resistance. Furthermore, during steps of transformation and manipulation of the material, but especially when the material is intended to undergo high-temperature heat treatment, the upper protective layers may be partially degraded if they are not adequately protected. The consequence of this is that the upper protective layer is made less effective, or even ineffective, after heat treatment.

The properties of the silver-based stacks, such as color neutrality or energy performance levels, result from a precise control of the optical interference effects. In most cases a compromise between obtaining good resistance before and after heat treatment and control of the interference effects is difficult to find. This considerably limits the choice for the upper protective layer (nature and thickness).

Indeed, the implementation of a heat treatment makes it necessary to choose an upper protective layer that is resistant to heat treatment, to the detriment of the choice of a protective layer capable of conferring on the stack the best properties, for example in terms of scratch resistance or energy performance levels.

This is all the more true for stacks which comprise several silver-based functional layers.

There is a need to more effectively protect the substrates coated with stacks acting on infrared radiation, comprising silver-based functional layers, during the production, transformation, transportation and/or storage steps.

There is also a need to improve the mechanical strength such as the corrosion resistance and the scratch resistance of the substrates coated with stacks, comprising a silver-based functional layer, which must undergo heat treatment. This improvement must be obtained before and after heat treatment.

The applicant has discovered, surprisingly, that the use of a protective coating comprising at least three layers, a lower protective layer, a central protective layer based on carbon graphite and an upper protective layer, makes it possible to considerably improve the scratch resistance.

The invention relates to a material comprising a transparent substrate coated with a stack of thin layers comprising at least one silver-based functional layer, characterized in that the stack comprises a protective coating deposited on top of at least one portion of the functional layer, the protective coating comprising:
  a lower protective layer having a thickness of between 1 and 10 nm,
  a central protective layer based on carbon graphite located on top of the lower protective layer, and
  an upper protective layer having a thickness of between 1 and 10 nm located on top of the central protective layer.

The invention also relates to a process for preparing a material comprising a transparent substrate coated with a stack of thin layers deposited by cathode sputtering, optionally magnetic field-enhanced cathode sputtering, the process comprising the sequence of the following steps:

at least one functional layer is deposited on the transparent substrate, then a coating based on dielectric materials is deposited on top of the functional layer, then a lower protective layer having a thickness of between 1 and 10 nm is deposited on top of the coating based on dielectric materials, a central protective layer of carbon graphite, preferably obtained by sputtering a carbon target, preferably a graphite target, is deposited on top of the lower protective layer, an upper protective layer having a thickness of between 1 and 10 nm is deposited on top of the central protective layer.

According to the process of the invention, the substrate thus coated is made to undergo a heat treatment in such a way as to remove, from the surface of said substrate, the central protective layer and the upper protective layer. The central layer is removed by oxidation to carbon dioxide. The upper protective layer is, for its part, removed by detachment from the remainder of the stack. The material comprising the protective coating based on three layers is obtained as an intermediate product during the implementation of the process according to the invention.

The preferred characteristics which appear in the remainder of the description are applicable both to the process according to the invention and, where appropriate, to the intermediate product according to the invention.

The solution of the invention comprising a protective coating made up of three layers makes it possible to considerably increase the choice of protective layers. It makes it possible in particular to choose both an upper protective layer having the best scratch resistance before tempering and a lower protective layer having the best scratch resistance after tempering. This choice can be made without being limited by the final optical, colorimetric and energy-performance properties insofar as some of the layers are eliminated following the heat treatment.

The solution of the invention also makes it possible to keep the lower protective layer intact before heat treatment. The solution of the invention thus makes it possible to ensure as well as possible the protection before and after heat treatment.

The lower protective layer can be described as "permanent" whereas the central protective layer and the upper protective layer can be described as "temporary".

According to the invention, the term "permanent layer" is intended to mean a layer which is not removed during the transformation, transportation and heat-treatment steps.

According to the invention, the term "temporary layer" is intended to mean a layer which is removed during the transformation, transportation and heat-treatment steps.

The presence, directly on top of the lower protective layer, of a carbon-based temporary central layer makes it possible, at the end of the heat treatment, to remove the central layer and the upper protective layer.

The presence of an upper protective layer located on top of the carbon layer having a thickness of 1 to 10 nm makes it possible to even further improve the scratch resistance before heat treatment by using an upper layer that is more effective than the carbon layer. Indeed, this upper layer can advantageously be chosen as a function of the stresses to which the stack must be subjected before heat treatment.

The removal step is advantageously carried out after steps of transportation, of cutting and of handling of the substrate, the temporary part of the protective coating possibly then protecting the surface of the substrate against scratches.

In the final material, after removal of the temporary layers of the protective coating, all of the surface of the lower protective layer is preferably in contact with the exterior.

The lower protective layer and/or the upper protective layer are chosen from a layer of titanium, of zirconium, of hafnium, of zinc and/or of tin, this or these metal(s) being in the metal, oxidized or nitrided form.

The lower protective layer and/or the upper protective layer can thus be chosen from a:
metal layer of titanium; of zirconium; of hafnium; of titanium and zirconium; of titanium, zirconium and hafnium; of zinc and tin;
a layer of titanium nitride; of zirconium nitride; of hafnium nitride; of titanium and zirconium nitride; of titanium, zirconium and hafnium nitride;
a layer of titanium oxide; of zirconium oxide; of hafnium oxide; of titanium and zirconium oxide; of titanium, zirconium and hafnium oxide; of zinc and tin oxide.

According to one embodiment, the lower protective layer and/or the upper protective layer is (are) based on titanium and zirconium and comprise(s) these two metals which are in the metal, oxidized or nitrided form (hereinafter based on titanium and zirconium).

According to one embodiment, the lower protective layer and/or the upper protective layer is (are) based on titanium oxide.

The layers based on titanium and zirconium have, in order of increasing preference, a weight ratio of titanium to zirconium Ti/Zr of between 40/60 and 90/10, between 50/50 and 80/20, between 60/40 and 70/30, between 60/40 and 65/35.

The layers based on titanium and zirconium have, in order of increasing preference, an atomic ratio of titanium to zirconium Ti/Zr of between 70/30 and 95/5, between 70/30 and 85/15, between 70/30 and 80/20.

The layers based on titanium zirconium oxide can be deposited from a TiZr metal target or TiZrOx ceramic target. The ratio of titanium to zirconium Ti/Zr in the layer is virtually equivalent to that of the target. The ceramic or metal targets can optionally comprise other elements that are found in the layers deposited from these targets.

The lower protective layer and/or the upper protective layer have a thickness:
of less than or equal to 10 nm, less than or equal to 7 nm or less than or equal to 5 nm, and/or
of greater than or equal to 1 nm, greater than or equal to 2 nm or greater than or equal to 3 nm.

According to the invention, a carbon-based layer comprises at least 95.0%, preferably at least 96.5% and better still at least 98.0% by weight of carbon relative to the weight of the carbon-based layer. Preferably, the carbon-based layer comprises less than 1.0% by weight of elements other than carbon, relative to the weight of the carbon-based layer.

The central protective layer based on carbon graphite comprises carbon atoms essentially in an $sp^2$ hybridization state. This means that the carbon atoms forming carbon-carbon bonds are essentially in an $sp^2$ hybridization state. It is considered that the carbon atoms of the layer are essentially in an $sp^2$ hybridization state when at least 80%, at least 90%, or even at least 100% of the carbon atoms are in an $sp^2$ hybridization state. The carbon atom hybridization can be characterized by Fourier transform infrared (FTIR) spectroscopy.

The carbon-based layer according to the invention differs, by virtue of this characteristic, from the "DLC" layers which are layers of optionally hydrogenated amorphous carbon comprising carbon atoms in a mixture of $sp^2$ and $sp^3$ hybridization states, preferably essentially sp$^3$. The carbon atoms are not essentially in an sp$^2$ hybridization state.

The carbon-based central protective layer according to the invention can be obtained by magnetic field-enhanced cathode sputtering, for example using a graphite target. The atmosphere in the depositing chamber comprises a neutral gas, preferably argon.

According to one embodiment, the central protective layer has a thickness:
- of less than or equal to 5 nm, less than or equal to 2 nm, less than 1 nm and/or
- of greater than or equal to 0.1 nm, greater than or equal to 0.2 nm, greater than or equal to 0.5 nm.

According to one advantageous embodiment, the central protective layer has a thickness of strictly less than 1 nm, preferably of between 0.2 and 0.8 nm.

All the luminous characteristics presented in the present description are obtained according to the principles and methods described in European standard EN 410 relating to the determination of luminous and solar characteristics of glazings used in glass in building. For the purposes of the present description, the term "Abs." is intended to mean the absorption at normal incidence, under the D65 illuminant with a 2° field of vision.

The stack is deposited by magnetic field-enhanced cathode sputtering (magnetron sputtering process). According to this advantageous embodiment, all the layers of the stack are deposited by magnetic field-enhanced cathode sputtering.

Unless otherwise mentioned, the thicknesses cited in the present document are physical thicknesses and the layers are thin layers. The term "thin layer" is intended to mean a layer having a thickness of between 0.1 nm and 100 micrometers.

Throughout the description, the substrate according to the invention is considered to be put down horizontally. The stack of thin layers is deposited on top of the substrate. The direction of the expressions "on top of" and "below" and "lower" and "upper" should be considered relative to this orientation. Unless specifically stipulated, the expressions "on top of" and "below" do not necessarily mean that two layers and/or coatings are placed in contact with one another. When it is specified that a layer is deposited "in contact" with another layer or with a coating, this means that there cannot be one or more layers inserted between these two layers.

A silver-based functional metal layer comprises at least 95.0%, preferably at least 96.5% and better still at least 98.0% by weight of silver relative to the weight of the functional layer. Preferably, the silver-based functional metal layer comprises less than 1.0% by weight of metals other than silver relative to the weight of the silver-based functional metal layer.

The thickness of the silver-based functional layers is, in order of increasing preference, from 5 to 20 nm, from 8 to 15 nm.

The silver layers are deposited between coatings based on dielectric materials which generally comprise several dielectric layers making it possible to adjust the optical properties of the stack. These dielectric layers also make it possible to protect the silver layer against chemical or mechanical attacks.

The stacks can also comprise blocking layers of which the function is to protect the functional layers by preventing any degradation linked to the depositing of a coating based on dielectric materials or linked to a heat treatment. According to one embodiment, the stack comprises at least one blocking layer located below and in contact with a silver-based functional metal layer and/or at least one blocking layer located on top of and in contact with a silver-based functional metal layer.

Among the blocking layers conventionally used, in particular when the functional layer is a silver-based metal layer, mention may be made of blocking layers based on a metal chosen from niobium Nb, tantalum Ta, titanium Ti, chromium Cr or nickel Ni or based on an alloy obtained from at least two of these metals, in particular on an alloy of nickel and chromium (NiCr).

The thickness of each blocking overlayer or underlayer is preferably:
- at least 0.5 nm or at least 0.8 nm and/or
- at most 5.0 nm or at most 2.0 nm.

According to one embodiment, the stack of thin layers comprises at least one silver-based functional metal layer, and at least two coatings based on dielectric materials, each coating comprising at least one dielectric layer, in such a way that each functional metal layer is placed between two coatings based on dielectric materials.

According to another embodiment, the stack of thin layers comprises at least two silver-based functional metal layers, and at least three coatings based on dielectric materials, each coating comprising at least one dielectric layer, in such a way that each functional metal layer is placed between two coatings based on dielectric materials.

According to another embodiment, the stack of thin layers comprises at least three silver-based functional metal layers, and at least four coatings based on dielectric materials, each coating comprising at least one dielectric layer, in such a way that each functional metal layer is placed between two coatings based on dielectric materials.

The coatings based on dielectric materials have a thickness of greater than 15 nm, preferably of between 15 and 50 nm and better still from 30 to 40 nm.

The dielectric layers of the coatings based on dielectric materials have the following characteristics, alone or in combination:
- they are deposited by magnetic field-enhanced cathode sputtering,
- they are chosen from dielectric layers with a barrier function or with a stabilizing function,
- they are chosen from oxides or nitrides of one or more elements chosen from titanium, silicon, aluminum, tin and zinc,
- they have a thickness of greater than 5 nm, preferably of between 8 and 35 nm.

The term "dielectric layers with a barrier function" is intended to mean a layer made of a material capable of being a barrier to the diffusion of oxygen and of water at high temperature, originating from the ambient atmosphere or from the transparent substrate, to the functional layer. The dielectric layers with a barrier function can be based on silicon and/or aluminum compounds chosen from oxides, such as $SiO_2$, nitrides such as silicon nitride $Si_3N_4$ and the aluminum nitrides AlN, and oxynitrides $SiO_xN_y$, optionally doped with at least one other element. The dielectric layers with a barrier function can also be based on tin zinc oxide.

The term "dielectric layers with a stabilizing function" is intended to mean a layer made of a material capable of stabilizing the interface between the functional layer and this layer. The dielectric layers with a stabilizing function are preferably based on crystallized oxide, in particular based on zinc oxide, optionally doped with at least one other element, such as aluminum. The dielectric layer(s) with a stabilizing function are preferably layers of zinc oxide.

The dielectric layer(s) with a stabilizing function can be on top of and/or below at least one silver-based functional metal layer or on top of and/or below each silver-based functional metal layer, or directly in contact therewith or separated by a blocking layer.

According to one advantageous embodiment, the stack comprises a dielectric layer based on silicon and/or aluminum nitride located on top of at least one portion of the functional layer and below the lower protective layer based on titanium and zirconium. The dielectric layer based on silicon nitride and/or aluminum nitride has a thickness:
- of less than or equal to 100 nm, less than or equal to 50 nm or less than or equal to 40 nm, and/or
- of greater than or equal to 15 nm, greater than or equal to 20 nm or greater than or equal to 25 nm.

The dielectric layer based on silicon and/or aluminum nitride is preferably in contact with the lower protective layer based on titanium and zirconium.

The lower protective layer based on titanium and zirconium is preferably in contact with the central protective layer.

The central protective layer is preferably in contact with the upper protective layer.

The upper protective layer is preferably the final layer of the stack, that is to say the layer the furthest away from the substrate coated with the stack (before heat treatment).

The lower protective layer is preferably the final layer of the stack, that is to say the layer the furthest away from the substrate coated with the stack (after heat treatment).

An example of a suitable stack according to the invention comprises:
- a coating based on dielectric materials, located below the silver-based functional metal layer, the coating possibly comprising at least one dielectric layer based on silicon and/or aluminum nitride,
- optionally a blocking layer,
- a silver-based functional metal layer,
- optionally a blocking layer,
- a coating based on dielectric materials, located on top of the silver-based functional metal layer, the coating possibly comprising at least one dielectric layer based on silicon and/or aluminum nitride,
- a protective layer.

The transparent substrates according to the invention are preferably made of a rigid inorganic material, such as made of glass, or organic materials based on polymers (or made of polymer).

The organic transparent substrates according to the invention can also be made of polymer, and can be rigid or flexible. Examples of polymers which are suitable according to the invention comprise, in particular:
- polyethylene,
- polyesters, such as polyethylene terephthalate (PET), polybutylene terephthalate (PBT) or polyethylene naphthalate (PEN);
- polyacrylates, such as poly(methyl) methacrylate (PMMA);
- polycarbonates;
- polyurethanes;
- polyamides;
- polyimides;
- fluorinated polymers, for instance fluoroesters, such as ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);
- photocrosslinkable and/or photopolymerizable resins, such as thiolene, polyurethane, urethane-acrylate, polyester-acrylate resins, and
- polythiourethanes.

The substrate is preferably a sheet of glass or of glass-ceramic.

The substrate is preferably transparent, colorless (it is then a clear or extra-clear glass) or colored, for example colored blue, gray or bronze. The glass is preferably of soda-lime-silica type, but it may also be made of glass of borosilicate or alumino-borosilicate type.

The substrate advantageously has at least one dimension greater than or equal to 1 m, or even 2 m and even 3 m. The thickness of the substrate generally varies between 0.5 mm and 19 mm, preferably between 0.7 and 9 mm, in particular between 2 and 8 mm, or even between 4 and 6 mm. The substrate may be flat or curved, or even flexible.

The material, that is to say the transparent substrate coated with the stack, is intended to undergo a high-temperature heat treatment chosen from annealing, for example by flash annealing, such as laser or flame annealing, a tempering and/or a bending. The temperature of the heat treatment is greater than 400° C., preferably greater than 450° C., and better still greater than 500° C. The substrate coated with the stack may therefore be curved and/or tempered.

The material may be in the form of monolithic glazing, laminated glazing or multiple glazing, in particular double glazing or triple glazing.

The invention also relates to a process for preparing the material. The process also comprises the step during which the substrate thus coated is made to undergo a heat treatment in such a way as to remove, from the surface of said substrate, the central protective layer and the upper protective layer. This heat treatment can be carried out at a temperature greater than 300° C. or greater than 400° C., preferably greater than 500° C.

This removal step is preferably carried out just before the step of integrating the material into a glazing.

The heat treatment is preferably chosen from tempering, annealing and rapid annealing treatments.

The tempering or annealing treatment is generally carried out in a furnace, respectively a tempering or annealing furnace. All of the material, including therefore the substrate, can be brought to a high temperature, of at least 300° C. in the case of annealing, and of at least 500° C., or even 600° C., in the case of a tempering.

The rapid annealing is preferably carried out using a flame, a plasma torch or laser radiation. In this type of process, a relative movement is created between the substrate and the device (flame, laser, plasma torch) in order to treat the material. Generally, the device is mobile, and the material runs past facing the device in such a way as to treat its surface. These processes make it possible to deliver a high energy density in a very short space of time, thus limiting the diffusion of heat toward the substrate, and thus the heating of said substrate. The temperature of the substrate is generally at most 100° C., or even 50° and even 30° C. during the treatment. Each point of the thin layer is subjected to the rapid annealing treatment for a period of generally less than or equal to 1 second, or even 0.5 second. The rapid annealing heat treatment is preferably carried out using laser radiation, in particular infrared radiation. Such a process is for example described in application WO 2012/022874. The laser radiation device can be integrated into a layer depositing line, for example a line for depositing by magnetic field-enhanced cathode sputtering (magnetron sputtering process).

The examples which follow illustrate the invention without, however, limiting it.

EXAMPLES

Stacks of thin layers defined hereinafter are deposited on substrates made of clear soda-lime glass 4 mm thick.

The stacks are deposited, in a known manner, on a cathode sputtering line (magnetron sputtering process) in which the substrate runs past under various targets.

For these examples, the conditions for depositing the layers deposited by sputtering (sputtering termed "magnetron cathode sputtering") are summarized in the table below.

TABLE 1

| | Targets used | Depositing pressure | Gas | Index* |
|---|---|---|---|---|
| $Si_3N_4$ | Si:Al (92:8% by wt) | $2\text{-}15 \times 10^{-3}$ mbar | Ar:30-60% - $N_2$:40-70% | 2.00 |
| NiCr | Ni:Cr (80:20% at.) | $1\text{-}5 \times 10^{-3}$ mbar | Ar at 100% | — |
| Ag | Ag | $2\text{-}3 \times 10^{-3}$ mbar | Ar at 100% | — |
| $TiO_2$ | TiOx | $1.5 \times 10^{-3}$ mbar | Ar 88% - $O_2$ 12% | 2.32 |
| TiZr | TiZr | $2\text{-}4 \times 10^{-3}$ mbar | Ar at 100% | — |
| C | Graphite | $1.5 \times 10^{-3}$ mbar | Ar at 100% | 2.25 | at.: atomic;
wt: weight;
*at 550 nm.

The layers of titanium and of zirconium are deposited from a metal target of TiZr. The titanium to zirconium Ti/Zr ratio in the target is approximately 57:43 by weight. The ratio of titanium to zirconium Ti/Zr in the layer is virtually equivalent to that of the target.

The substrates are all coated with a stack of thin layers comprising three silver-based functional layers varying only by the nature of the protective coating. This stack comprises the following sequence of layers starting from the glass substrate:

Coating based on dielectric materials: $Si_3N_4$/ZnO,
Ag/NiCr,
Coating based on dielectric materials: ZnO/$Si_3N_4$/ZnO,
Ag/NiCr,
Coating based on dielectric materials: ZnO/$Si_3N_4$/ZnO,
Ag/NiCr,
Coating based on dielectric materials: ZnO/$Si_3N_4$,
Protective coating.

The coated substrates are heat treated. The temporary portion of the protective coating is totally removed.

| Heat treatment | Protective coating: Protective layer | Inv. 1 | Inv. 2 | Inv. 3 | Comp. 1 | Comp. 2 |
|---|---|---|---|---|---|---|
| Before | Upper (1 to 5 nm) | TiOx | TiOx | TiOx | — | — |
| | Central (1 to 3 nm) | C | C | C | — | — |
| | Lower (1 to 5 nm) | TiZr | SnZnO | TiOx | TiZr | TiZr |
| After | Lower (1 to 5 nm) | TiZrO | SnZnO | TiOx | TiZrO | TiZrO |

After heat treatment, the lower protective layers based on titanium and zirconium are oxidized. In order to evaluate the mechanical strength of the stack, various tests were carried out:
Steel wool test
Harp test.

The steel wool test and the harp test are two tests which consist in deliberately producing scratches at the surface of the material on the side of the stack.

The steel wool test consists in carrying out a certain number of to-and-fro movements by rubbing the coated material on the side of the stack with a piece of steel wool with a constant pressure.

The objective of the harp test is to simulate the rubbing conditions to which a substrate coated with a stack may be subjected in a harp carriage. This test consists in rubbing the coated material on the side of the stack with a string originating from a harp carriage.

These two tests were carried out on cleaned substrates. The cleaned substrates undergo, after producing scratches, a cleaning step consisting of several passes through a washing machine.

The substrates are subsequently tempered, for example for 5 minutes at 650° C. The state of the material is then assessed visually.

A grade is assigned as a function of the following scale of grades:
1: glass not or very slightly scratched (0 to 5 scratches),
2: glass slightly scratched (up to 20 scratches),
3: glass quite scratched (up to 50 scratches),
4: glass highly scratched (number of scratches greater than 50).

| Example | Test | Grade | Observation |
|---|---|---|---|
| Inv. 1 | Steel wool | 1 | Nothing to the naked eye |
| | Harp | 1 | |
| Comp. 1 | Steel wool | 2 | A few points of corrosion along the sites rubbed by the strings |
| | Harp | 2 | |
| Comp. 2 | Steel wool | 2 | A few points of corrosion along the sites rubbed by the strings |
| | Harp | 2 | |

The material according to the invention satisfies each of these tests and gives, from the viewpoint of scratch resistance, excellent results. Furthermore, the washing step does not modify the good scratch resistance properties obtained.

In order to evaluate the mechanical strength of the stack, the various following tests were carried out on the material according to the invention:
Erichsen scratch test (EST),
Erichsen brush test (EBT) before and after tempering at 1000 cycles,
Cleaning test.

The Erichsen brush test (EBT) consists in subjecting various coated substrates, before tempering (EBT) and after tempering (TT-EBT), to a certain number of cycles (1000) during which the stack, covered with water, is rubbed using a brush. It is considered that a substrate satisfies the test if no mark is visible to the naked eye. The test before tempering gives a good indication with regard to the ability of the glazing to be scratched during a washing operation. The test after tempering gives a good indication with regard to the propagation of the scratches after heat treatment.

The Erichsen scratch test (EST) consists in applying a force to the sample, in Newtons, using a tip (Van Laar tip, steel ball). Depending on the scratch resistance of the stack, various types of scratches can be obtained: continuous, noncontinuous, wide, narrow, etc.

The cleaning test consists in passing the substrate through a washing machine three times.

The material according to the invention satisfies each of these tests and gives, from the viewpoint of scratch resistance, excellent results.

The invention claimed is:

1. A material comprising a transparent substrate coated with a stack of thin layers comprising at least one silver-based functional layer, wherein the stack comprises a protective coating deposited on top of at least one portion of the functional layer, the protective coating comprising:
   a lower protective layer having a thickness of between 1 and 5 nm,
   a central protective layer based on carbon graphite located on top of the lower protective layer, the central protective layer being in direct contact with the lower protective layer, and
   an upper protective layer having a thickness of between 1 and 5 nm located on top of the central protective layer, the upper protective layer being in direct contact with the central protective layer,
   wherein the lower protective layer and the upper protective layer are chosen from a layer of titanium, of zirconium, of hafnium, of zinc and/or tin, this or these metal(s) being in the metal, oxidized or nitrided form, and
   wherein both the central protective layer and the upper protective layer are temporary layers that are configured to be removed during a single heat treatment step performed on the transparent substrate coated with the protective coating and the lower protective layer is a permanent layer that is not removed during said heat treatment step.

2. The material as claimed in claim 1, wherein the lower protective layer is based on titanium and zirconium, these two metals being in the metal, oxidized or nitrided form.

3. The material as claimed in claim 2, wherein the lower protective layer based on titanium and zirconium has a weight ratio of titanium to zirconium Ti/Zr of between 40/60 and 90/10.

4. The material as claimed in claim 1, wherein the upper protective layer is based on titanium oxide.

5. The material as claimed in claim 1, wherein the central protective layer based on carbon graphite comprises carbon atoms essentially in an $sp^2$ hybridization state.

6. The material as claimed in claim 1, wherein the central protective layer has a thickness:
   of less than or equal to 5 nm, and/or
   of greater than or equal to 0.5 nm.

7. The material as claimed in claim 1, wherein the stack of thin layers comprises at least one silver-based functional metal layer, and at least two coatings based on dielectric materials, each coating comprising at least one dielectric layer, in such a way that each functional metal layer is placed between two coatings based on dielectric materials.

8. The material as claimed in claim 1, wherein the stack of thin layers comprises at least two silver-based functional metal layers, and at least three coatings based on dielectric materials, each coating comprising at least one dielectric layer, in such a way that each functional metal layer is placed between two coatings based on dielectric materials.

9. The material as claimed in claim 1, wherein the stack of thin layers comprises at least three silver-based functional metal layers, and at least four coatings based on dielectric materials, each coating comprising at least one dielectric layer, in such a way that each functional metal layer is placed between two coatings based on dielectric materials.

10. The material as claimed in claim 1, wherein the stack comprises, successively:
    a coating based on dielectric materials, placed below the silver-based functional metal layer,
    optionally a first blocking layer,
    said silver-based functional metal layer,
    optionally a second blocking layer,
    a coating based on dielectric materials, located on top of the silver-based functional metal layer,
    said protective coating.

11. The material as claimed in claim 1, wherein the transparent substrate is:
    made of glass, or
    made of polymer.

12. The material as claimed in claim 11, wherein the glass is soda-lime-silica glass.

13. The material as claimed in claim 11, wherein the polymer is polyethylene, polyethylene terephthalate or polyethylene naphthalate.

14. The material as claimed in claim 1, wherein the central protective layer has a thickness between 1 and 3 nm.

15. The material as claimed in claim 1, wherein the upper protective layer is a layer of titanium oxide and the lower protective layer is a layer based on TiZr, SnZnO or titanium oxide.

16. A process for preparing a material comprising a transparent substrate coated with a stack of thin layers deposited by cathode sputtering, optionally magnetic field-enhanced cathode sputtering, the process comprising the sequence of the following steps:
    depositing at least one silver-based functional layer on the transparent substrate, then
    depositing a coating based on dielectric materials on top of the at least one silver-based functional layer, then
    depositing a lower protective layer having a thickness of between 1 and 5 nm on top of the coating based on dielectric materials,
    depositing a central protective layer of carbon graphite directly on top of the lower protective layer, and
    depositing an upper protective layer having a thickness of between 1 and 5 nm directly on top of the central protective layer,
    wherein the lower protective layer and the upper protective layer are chosen from a layer of titanium, of zirconium, of hafnium, of zinc and/or tin, this or these metal(s) being in the metal, oxidized or nitrided form, and
    wherein both the central protective layer and the upper protective layer are temporary layers that are configured to be removed during a single heat treatment step performed on the transparent substrate coated with the lower, central and upper protective layers and the lower protective layer is a permanent layer that is not removed during said heat treatment step.

17. The process for preparing a material as claimed in claim 16, further comprising, after depositing the upper protective layer, performing on the transparent substrate thus coated said single heat treatment step in such a way as to remove, from the surface of said substrate, the central protective layer and the upper protective layer.

18. The process as claimed in claim 17, wherein the heat treatment is carried out after cutting the transparent substrate coated with the lower, central and upper protective layers.

* * * * *